(12) United States Patent
Park et al.

(10) Patent No.: US 8,808,921 B2
(45) Date of Patent: Aug. 19, 2014

(54) CURRENT COLLECTOR FOR FLEXIBLE ELECTRODE, METHOD OF MANUFACTURING SAME, AND NEGATIVE ELECTRODE INCLUDING SAME

(75) Inventors: Soojin Park, Ulsan (KR); Jae-Phil Cho, Ulsan (KR); Hyun-Kon Song, Ulsan (KR); Jung-In Lee, Gunpo-si (KR)

(73) Assignee: Unist Academy-Industry Research Corporation, Ulsan (KR)

( * ) Notice: Subject to any disclaimer, the term of this patent is extended or adjusted under 35 U.S.C. 154(b) by 30 days.

(21) Appl. No.: 13/576,703

(22) PCT Filed: May 18, 2010

(86) PCT No.: PCT/KR2010/003141
§ 371 (c)(1),
(2), (4) Date: Aug. 2, 2012

(87) PCT Pub. No.: WO2011/118879
PCT Pub. Date: Sep. 29, 2011

(65) Prior Publication Data
US 2013/0011742 A1    Jan. 10, 2013

(30) Foreign Application Priority Data

Mar. 26, 2010    (KR) ........................ 10-2010-0027557

(51) Int. Cl.
*H01M 4/66*     (2006.01)
*H01M 4/13*     (2010.01)
*H01M 4/70*     (2006.01)
*B32B 7/04*     (2006.01)
*B32B 15/09*    (2006.01)
*B32B 15/095*   (2006.01)
*B32B 15/085*   (2006.01)

(52) U.S. Cl.
CPC ................ *H01M 4/661* (2013.01); *B32B 7/045* (2013.01); *B32B 15/09* (2013.01); *H01M 4/13* (2013.01); *B32B 15/095* (2013.01); *H01M 4/668* (2013.01); *H01M 4/667* (2013.01); *H01M 4/70* (2013.01); *Y02E 60/122* (2013.01); *B32B 15/085* (2013.01); *B32B 2457/00* (2013.01)
USPC .............................. 429/234; 205/164; 427/58

(58) Field of Classification Search
CPC ........ H01M 4/667; H01M 4/13; H01M 4/661
USPC ......................................................... 429/234
See application file for complete search history.

(56) References Cited

U.S. PATENT DOCUMENTS 6,773,468 B2 *  8/2004  Lang ........................... 29/25.03
6,933,077 B2     8/2005  Sudano et al.

FOREIGN PATENT DOCUMENTS

| JP | 2006-512722 | 4/2006 |
| KR | 10-0669338 | 9/2007 |
| WO | 2004/086549 | 10/2004 |

OTHER PUBLICATIONS

Machine translation of KR 10-0669338, obtained Jul. 9, 2013.*

(Continued)

*Primary Examiner* — Nicholas P D'Aniello
(74) *Attorney, Agent, or Firm* — Lexyoume IP Meister, PLLC

(57) ABSTRACT

Disclosed are a current collector for a flexible electrode, a method of manufacturing the same, and a negative electrode including the same. The current collector for a flexible electrode includes: a flexible polymer substrate; a cross-linkable polymer layer disposed on the polymer substrate; and a metal layer disposed on the cross-linkable polymer layer, wherein the surface of the cross-linkable polymer layer includes a plurality of protrusions and grooves.

7 Claims, 6 Drawing Sheets

(a)

(b)

(56) References Cited

OTHER PUBLICATIONS

Pingel et al. "Thermally crosslinkable thermoplastic PET-co-XTA copolyesters", Polymer, vol. 40, Issue 1, Jan. 1999, pp. 53-64, ISSN 0032-3861, http://dx.doi.org/10.1016/S0032-3861(98)00216-X. (http://www.sciencedirect.com/science/article/pii/S003238619800216X).*

* cited by examiner

CURRENT COLLECTOR FOR FLEXIBLE ELECTRODE, METHOD OF MANUFACTURING SAME, AND NEGATIVE ELECTRODE INCLUDING SAME

CROSS-REFERENCE TO RELATED APPLICATION

This application claims priority to and the benefit of Korean Patent Application No. 10-2010-0027557 filed in the Korean Intellectual Property Office on Mar. 26, 2010, the entire contents of which are incorporated herein by reference.

BACKGROUND OF THE INVENTION (a) Field of the Invention

A current collector for a flexible electrode, a method of manufacturing the same, and a negative electrode including the same are disclosed.

(b) Description of the Related Art

As portable devices, such as mobile phones, laptop computers, personal digital assistants (PDA), electronic papers, and so forth, are down-sized and become increasingly thinner recently, researchers are paying more attention to down-sizing rechargeable lithium batteries and portability of the rechargeable lithium batteries, which are energy sources of the portable devices.

The rechargeable lithium batteries include: a lithium transition element composite oxide having a layered structure, such as lithium cobalt oxide, as a positive electrode; a graphite-based carbon cleaning agent, a silicon oxide-based composite material, silicon, a tin alloy, lithium, or vanadium oxide as a negative electrode; and a non-aqueous-based liquid and polymer electrolyte, and take advantage of high electric power and electrical capacity that are generated from a reaction where lithium ions intercalate/deintercalate to/from the inside of the active material.

An electrode is generally formed by fixing a powder material, which is used as an active material, on copper foil, which is a current collector, with an organic polymer, which is used as a binder. Usually, a copper plate is used as a current collector.

When a copper plate is used as a current collector, a compression process is performed to increase adherence between an electrode assembly and the current collector. After the compression process, dust is generated, and while the battery is charged and discharged, the negative active material comes off the surface of the current collector.

Since the decrease in the adherence between the negative active material and the copper current collector and an active material delamination phenomenon occurring from the decreased adherence increase the internal resistance of the battery, the performance of the battery is greatly deteriorated, such as deteriorated output characteristics of the battery and decreased battery capacity.

Also, in a flexible rechargeable lithium battery, the entire current collector is bent or deformed and it may be partially delaminated. As a result, the charge-discharge cycle characteristics of the battery are deteriorated and the cycle-life of the battery is reduced.

SUMMARY OF THE INVENTION

The problem of deterioration of characteristics of a flexible battery is solved by providing a current collector for a flexible electrode.

In accordance with one embodiment of the present invention, a current collector for a flexible electrode includes a flexible polymer substrate, a cross-linkable polymer layer disposed on the polymer substrate, and a metal layer disposed on the cross-linkable polymer layer, wherein the surface of the cross-linkable polymer layer includes a plurality of protrusions and grooves.

The flexible polymer substrate may include at least one selected from the group consisting of polyethylene terephthalate, polyimide, polyester, polyurethane, polyetheretherketone, polycarbonate, and polybutylene terephthalate.

The cross-linkable polymer layer may include a polymer including at least one functional group of a double bond, a triple bond, an epoxy group, a urethane group, and a combination thereof.

The metal layer may include at least one selected from the group consisting of copper (Cu), aluminum (Al), stainless steel, platinum (Pt), and gold (Au).

The height of the protrusions may range from 5 nm to 10 μm or 5 nm to 5 μm.

The protrusions and the grooves may include a repeating unit of a protrusion and a groove, and the repeating unit may be formed every 20 nm to 10 μm.

In accordance with another embodiment of the present invention, a method for manufacturing a current collector for a flexible electrode includes: (a) preparing a flexible polymer substrate; (b) forming a cross-linkable polymer layer on the polymer substrate; (c) forming a plurality of protrusions and a plurality of grooves on the surface of the cross-linkable polymer layer; and (d) forming a metal layer on the polymer layer where the protrusions and the grooves are formed.

The flexible polymer substrate may include at least one selected from the group consisting of polyethylene terephthalate, polyimide, polyester, polyurethane, polyetheretherketone, polycarbonate, and polybutylene terephthalate.

The cross-linkable polymer layer may include at least one selected from the group consisting of a polyimide-based polymer, a polyurethane-based polymer, a polyacetylene-based polymer, polybutadiene, and a polyisoprene-based polymer.

The metal layer may include at least one selected from the group consisting of copper (Cu), aluminum (Al), stainless steel, platinum (Pt), and gold (Au).

The height of the protrusions may range from 5 nm to 10 μm or 5 nm to 5 μm.

The protrusions and the grooves may include a repeating unit of one protrusion and one groove, and the repeating unit may be formed at every 20 nm to 10 μm.

The polymer layer of the (b) step may be formed through a spin coating process.

The spin coating process may be performed at 500 to 10,000 rpm.

The method may further include: drying the polymer layer that is formed after the polymer layer of the (b) step is formed at 40 to 150° C.

The protrusions and the grooves of the (c) step may be formed using a miscut sapphire.

The protrusions and the grooves of the (c) step may be formed using polydialkylsiloxane including a shape corresponding to the protrusions and grooves on the surface.

The metal layer of the (d) step may be formed through a method selected from the group consisting of thermal evaporation, electron beam evaporation, electrodeposition, electroless deposition, and a combination thereof.

In accordance with another embodiment of the present invention, a negative electrode includes: a current collector for a flexible electrode of any one of claims 1 to 6 that is coated with a negative active material, a conductive material, and a binder.

The technology of the present invention provides a current collector for a flexible electrode, and a rechargeable lithium battery having excellent capacity retention by preventing the delamination of a negative active material even when an electrode is bent, while having excellent capacity characteristics.

DETAILED DESCRIPTION

Exemplary embodiments will hereinafter be described in detail. However, these embodiments are exemplary, and this disclosure is not limited thereto.

One embodiment of the present invention provides a current collector for a flexible electrode that includes a flexible polymer substrate, a cross-linkable polymer layer disposed on the polymer substrate, and a metal layer disposed on the cross-linkable polymer layer, and the surface of the cross-linkable polymer layer has a plurality of protrusions and grooves.

The flexible polymer substrate may include at least one selected from the group consisting of polyethylene terephthalate, polyimide, polyester, polyurethane, polyetheretherketone, polycarbonate, and polybutylene terephthalate, but any flexible polymer may be used without limitation.

For example, polyethylene terephthalate containing an unit represented by the following Chemical Formula 1 or polybutylene terephthalate containing an unit represented by the following Chemical Formula 2 may be used.

[Chemical Formula 1]

[Chemical Formula 2]

The cross-linkable polymer layer may include a polymer including at least one functional group of a double bond, a triple bond, an epoxy group, an urethane group, and a combination thereof. For example, the polymer may include an epoxy-based polymer, a polyimide-based polymer, a polyurethane-based polymer, a polyacetylene-based polymer, polybutadiene, a polyisoprene-based polymer, and the like.

The epoxy-based polymer may be a polymer including an unit represented by the following Chemical Formula 3.

[Chemical Formula 3]

The cross-linkable polymer layer has excellent adhesion to the substrate and the metal layer. Also, the surface of the cross-linkable polymer layer has a plurality of protrusions and grooves.

The presence of protrusions and grooves on the surface means that the surface is formed rough to have a wide surface area. The protrusions signify protruded parts of the rough surface, and the grooves signify concave parts of the rough surface.

The surface roughness (Ra) may range from about 20 nm to about 20 μm. Within the range, the flexible current collector may effectively prevent the delamination of an active material. According to another embodiment of the present invention, the range may be between about 50 nm and about 10 μm.

The roughness may have a uniform pattern. For example, a pattern of protrusions or grooves may exist on the surface.

In the presence of the protrusions and grooves, the surface area becomes larger than that of a current collector with a flat surface, and the larger surface area may include more of the positive electrode active material or negative active material so as to have excellent battery characteristics. Also, the formation of the protrusions and grooves may prevent the delamination of a positive electrode active material or a negative active material even if the current collector is bent.

The height of the protrusions may range from about 5 nm to about 10 μm. Within the range, sufficient surface area is obtained and the negative active material may be effectively prevented from delaminating. According to another embodiment of the present invention, the range may be between about 5 nm and about 5 μm.

The protrusions and grooves include one height and one groove as a repeating unit, and the repeating unit may be formed at every 20 nm to 10 μm. Within the range, it is possible to include a sufficient amount of the negative active material, and prevent delamination of the negative active material.

The metal layer may include at least one selected from the group consisting of copper (Cu), aluminum (Al), stainless steel, platinum (Pt), and gold (Au). Although current collectors formed of copper (Cu) are generally used, it is obvious to those of ordinary skill in the art that the aforementioned metals such as aluminum (Al) may be used for a current collector.

According to another embodiment of the present invention, a method for manufacturing a current collector for a flexible electrode includes (a) preparing a flexible polymer substrate, (b) forming a cross-linkable polymer layer on the polymer substrate, (c) forming a plurality of protrusions and grooves on the surface of the cross-linkable polymer layer, and (d) forming a metal layer on the polymer layer where the protrusions and grooves are formed.

Since the flexible polymer substrate, the cross-linkable polymer layer, the metal layer, and the protrusions and grooves are the same as in the previously-described embodiment of the present invention, they are not described herein.

The (a) step of preparing the flexible polymer substrate may include a step of cleaning the polymer substrate in an organic solvent and distilled water. The organic solvent may include tetrahydrofuran, toluene, N-methyl-2-pyrrolidone, N,N-dimethyl formamide, and the like.

The polymer layer of the (b) step may be formed through a spin coating process. The spin coating process may be performed under the condition of 500 to 10,000 rpm for about 60 seconds to about 2 minutes. Within the range, a uniform polymer film may be obtained.

After the (b) step of forming the polymer layer, a step of drying the polymer layer at 40 to 150° C. is performed. This is to improve the adhesion between the substrate and the polymer layer. According to another embodiment of the present invention, the polymer layer may be dried in an oven at 40 to 150° C. for 30 minutes to 2 hours.

The (c) step of forming the protrusions and grooves may be performed using a miscut sapphire. According to the method, the miscut sapphire first obtains a shape corresponding to the protrusions and grooves. Subsequently, the shape of the miscut sapphire is transferred to the polymer layer by using heat and pressure.

The miscut sapphire obtains the shape through a heat treatment at 1100 to 1600° C. for 6 to 24 hours. The height of the protrusions formed through the heat treatment may range from about 5 to about 30 nm. Also, a repeating unit of a height and a groove may appear at every 20 to 200 nm.

The shape of the miscut sapphire is transferred to the polymer layer through a direct transfer, and the transfer may be performed at 50 to 180° C. for 10 minutes to 2 hours under the pressure of 0.1 to 10 MPa.

The shape may be transferred to the polymer layer through the above process after the protrusions and grooves of the miscut sapphire are coated with an organic silane compound or TEFLON (tetrafluoroethylene). When the miscut sapphire coated with an organic silane compound is manufactured through the coating process, the miscut sapphire may be easily taken off after the shape thereof is transferred to the polymer layer, which is advantageous, and when the miscut sapphire is coated with a TEFLON (tetrafluoroethylene) film having low surface energy, the miscut sapphire may be easily taken off after the pattern is transferred to plastics just as in the case where the miscut sapphire is coated with the silane compound, which is advantageous as well.

In the (c) step, the protrusions and grooves may be formed using polydialkylsiloxane having a shape corresponding to the protrusions and grooves formed on the surface. According to another embodiment of the present invention, polydimethylsiloxane (PDMS) may be used.

To be specific, the shape corresponding to the protrusions and grooves is formed in the polydimethylsiloxane, and the formed shape is transferred to the polymer substrate.

The shape corresponding to the protrusions and grooves is formed in the polydialkylsiloxane through a photolithography process.

When the protrusions and grooves are formed through the photolithography process, the height of the protrusions may range from 100 nm to 5 µm, and a repeating unit of a protrusion and a groove may appear every 200 nm to 10 µm.

Also, the shape corresponding to the protrusions and grooves may be formed in the polydialkylsiloxane through a holographic lithography process.

When the protrusions and grooves are formed through the holographic lithography process, the height of the protrusions may range from 100 nm to 5 µm, and a repeating unit of a protrusion and a groove may appear every 200 nm to 10 µm.

Protrusions and grooves may be formed in the polymer substrate by using polydialkylsiloxane where the protrusions and grooves are formed. The reaction condition may include a temperature of 50 to 100° C., a reaction time of 30 minutes to 2 hours, and a pressure of 0.1 to 10 MPa.

Subsequently, the polymer layer where the protrusions and grooves are selectively formed may be cured by radiating ultraviolet (UV) rays. The curing is carried out as the cross-linking bonds of a polymer in the inside of the polymer layer are enhanced. The used UV wavelength may range from 254 to 365 nm, and the radiation time may range from 1 minute to 6 hours.

Also, the polymer layer where the protrusions and grooves are selectively formed may go through an additional heat treatment at 80 to 120° C. in an atmosphere of nitrogen or argon for 30 minutes to 6 hours. The heat treatment is also performed to cure the polymer layer where the protrusions and grooves are formed.

Subsequently, a metal layer may be formed on the polymer layer where the protrusions and grooves are formed. Since the metal layer is the same as the metal layer in the previously-described embodiment of the present invention, description of the metal layer is omitted herein. Also, the metal layer may be deposited through any method that is obvious to a person of ordinary skill in the art. Non-limiting examples of the method for depositing the metal layer may include thermal evaporation, electron beam evaporation, electrodeposition, electroless deposition, and a combination thereof.

Among them, when the thermal evaporation method is used, the size of deposited copper particles is so small that the surface roughness is similar to copper foil, and when the electroless plating method is used, there is an advantage that the surface may be coated with copper.

Another embodiment of the present invention provides a negative electrode where a current collector for a flexible electrode is coated with a negative active material, a conductive material, and a binder.

The negative active material may include a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions includes a carbon material. The carbon material may be any generally-used carbon-based negative active material in a lithium ion secondary battery. Examples of the carbon material include crystalline carbon, amorphous carbon, and mixtures thereof. The crystalline carbon may be non-shaped, or sheet-, flake-, spherical-, or fiber-shaped natural graphite or artificial graphite. The amorphous carbon may be a soft carbon, a hard carbon, a mesophase pitch carbonization product, fired coke, of the like.

Examples of the lithium metal alloy include lithium and an element selected from the group consisting of Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ ($0<x<2$), a Si—Y alloy (wherein Y is an element selected from an alkali metal, an alkaline-earth metal, a Group 13 element, a Group 14 element, a transition element, a rare earth element, and a combination thereof, and not Si), Sn, $SnO_2$, Sn—Y (wherein Y is an element selected from an alkali metal, an alkaline-earth metal, a Group 13 element, a Group 14 element, a transition element, a rare earth element, and a combination thereof, and not Sn), and the like. At least one of these materials may be mixed with $SiO_2$. The element, Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide includes vanadium oxide, lithium vanadium oxide, and the like.

The negative active material layer may include a binder, and optionally a conductive material.

The binder improves binding properties of negative active material particles with one another and with a current collector. Examples of the binder include polyvinyl alcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity. Any electrically conductive material may be used as a conductive material unless it causes a chemical change. Examples of the conductive material include: a carbon-based material such as natural graphite, artificial graphite, carbon black, acetylene black, ketjen black, a carbon fiber, and the like; a metal-based material of a metal powder or metal fiber including copper, nickel, aluminum, silver, and the like; a conductive polymer such as polyphenylene derivatives; or mixtures thereof.

The following examples illustrate the present invention in more detail. These examples, however, are not in any sense to be interpreted as limiting the scope of the invention.

Example 1

Figure 1:
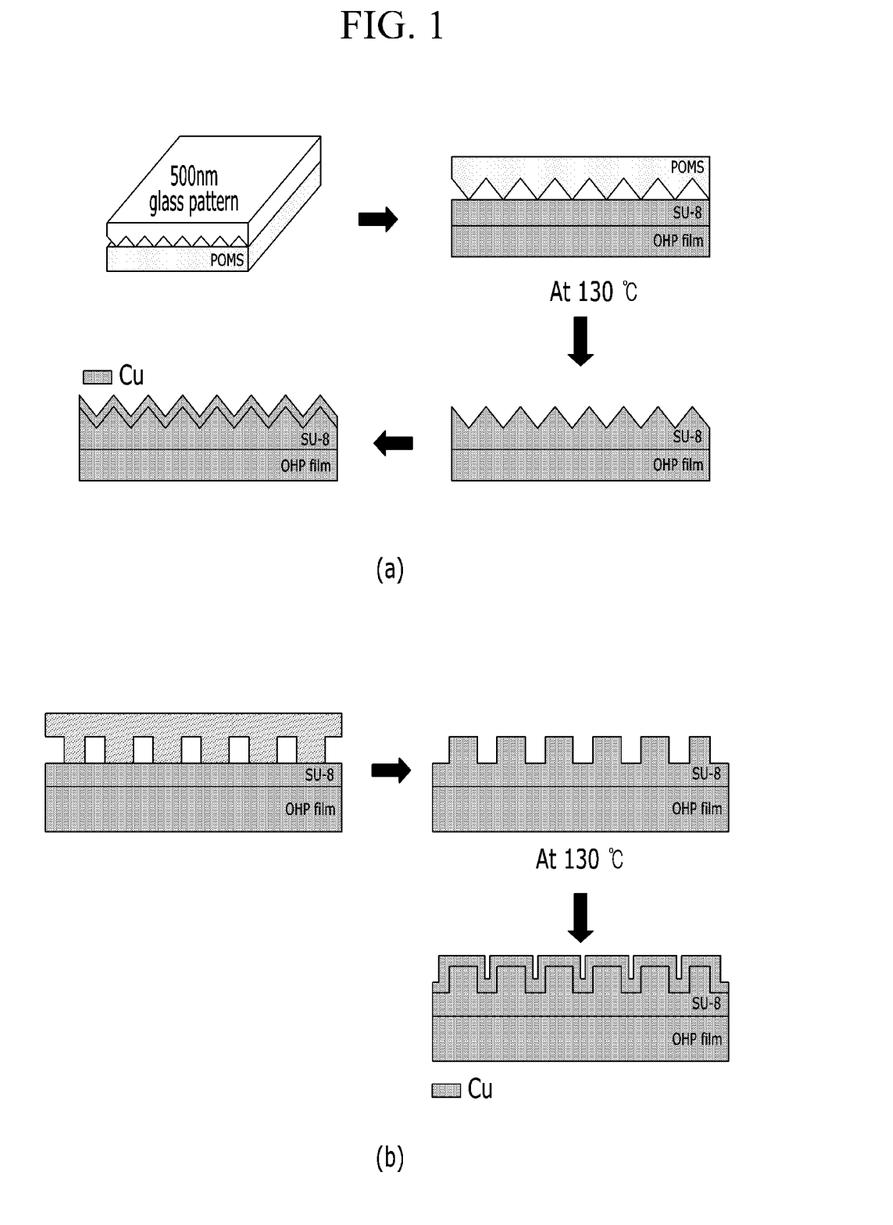
FIG. 1 is flowchart describing a method for manufacturing a current collector for a flexible electrode in accordance with one embodiment of the present invention.

FIG. 1 is flowchart describing a method for manufacturing a current collector for a flexible electrode in accordance with one embodiment of the present invention. In FIG. 1, the difference between (a) and (b) is the shape of the surface of a polymer layer (i.e., the shape of protrusions and grooves). The manufacturing is the same except for the surface shape. Specific examples are as follows.

Polyethylene terephthalate was used as a polymer substrate. The polymer substrate was precipitated in tetrahydrofuran for 1 hour and then cleaned with distilled water.

The cleaned polyethylene terephthalate polymer substrate was spin-coated with SU-8 (MicroChem, Su-8 2000.5), which is a cross-linkable epoxy-based polymer, at 3000 rpm for about 1 minute.

After the coating process, the polymer substrate was dried in an oven at 80° C. for 1 hour to improve the adhesion between the polyethylene terephthalate polymer substrate and the spin-coated polymer layer.

The polymer substrate where the polymer layer was formed was set onto a flat plate at a temperature of 80° C.

Polydimethylsiloxane (PDMS) including the protrusions and grooves (e.g., sawtooth or trench pattern shape) was prepared and made to contact the polymer layer to transfer the shape.

A weight of greater than or equal to 1 kg was applied to the polydimethylsiloxane to facilitate the transfer, and the polymer substrate was heated up to 130° C. and the condition was maintained for about 1 hour.

The polydimethylsiloxane was removed, and the polymer substrate was exposed to UV at 365 nm for about 5 minutes to make the shape of the polymer layer more firm, and then heat treatment was performed at 110° C. for 10 minutes and 120° C. for more than or equal to 10 minutes.

Subsequently, copper was deposited on the polymer layer through the thermal evaporation process.

Experimental Example

Atomic Force Microscope (AFM) Photograph

Figure 2:
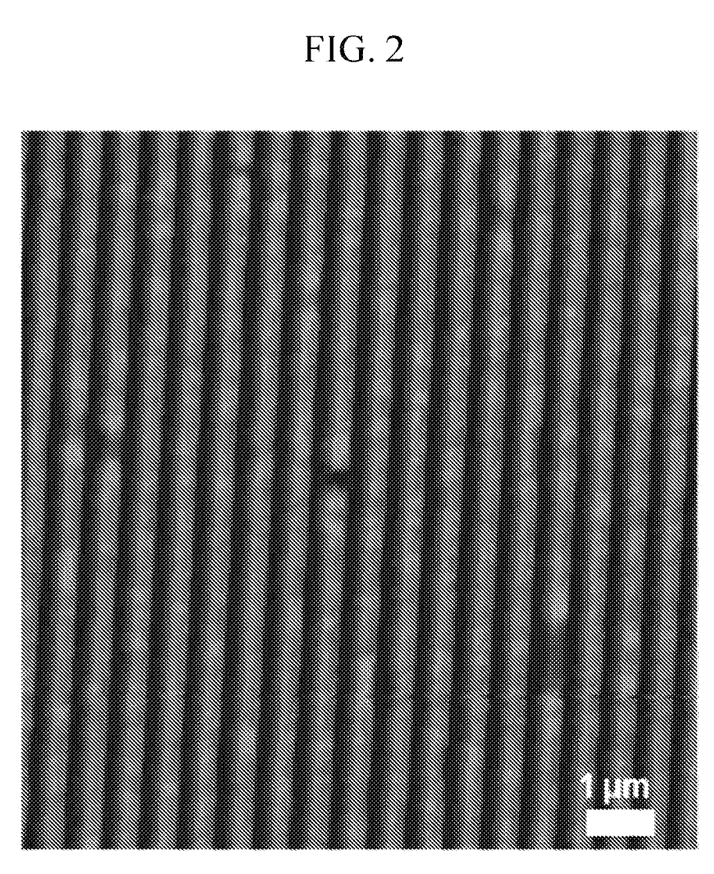
FIG. 2 is an atomic force microscopic photograph after protrusions and grooves are formed on a polymer layer.

FIG. 2 is an atomic force microscopic photograph after protrusions and grooves are formed on a polymer layer.

Figure 3:
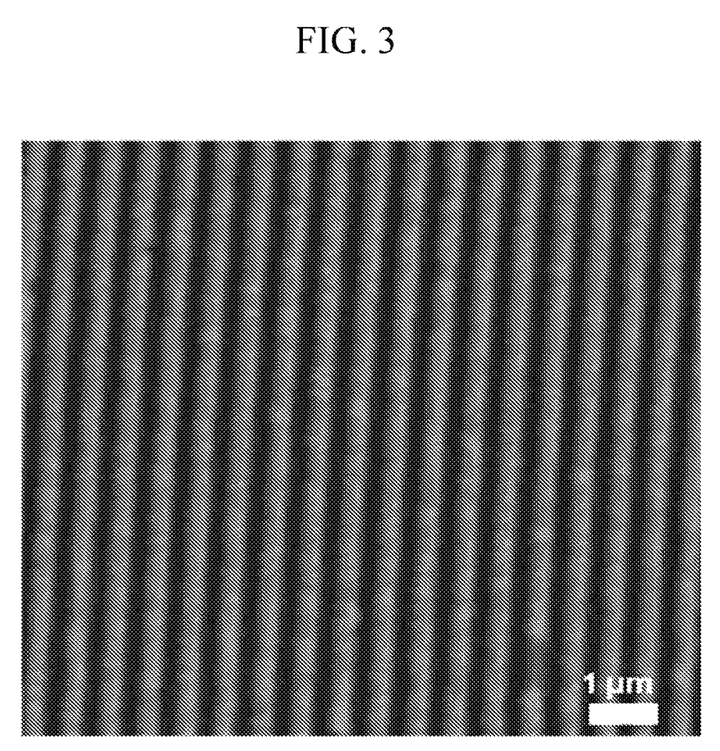
FIG. 3 is an atomic force microscopic photograph after the polymer layer with the protrusions and grooves goes through ultraviolet radiation and heat treatment.

FIG. 3 is an atomic force microscopic photograph after the polymer layer with the protrusions and grooves goes through ultraviolet radiation and heat treatment.

Figure 4:
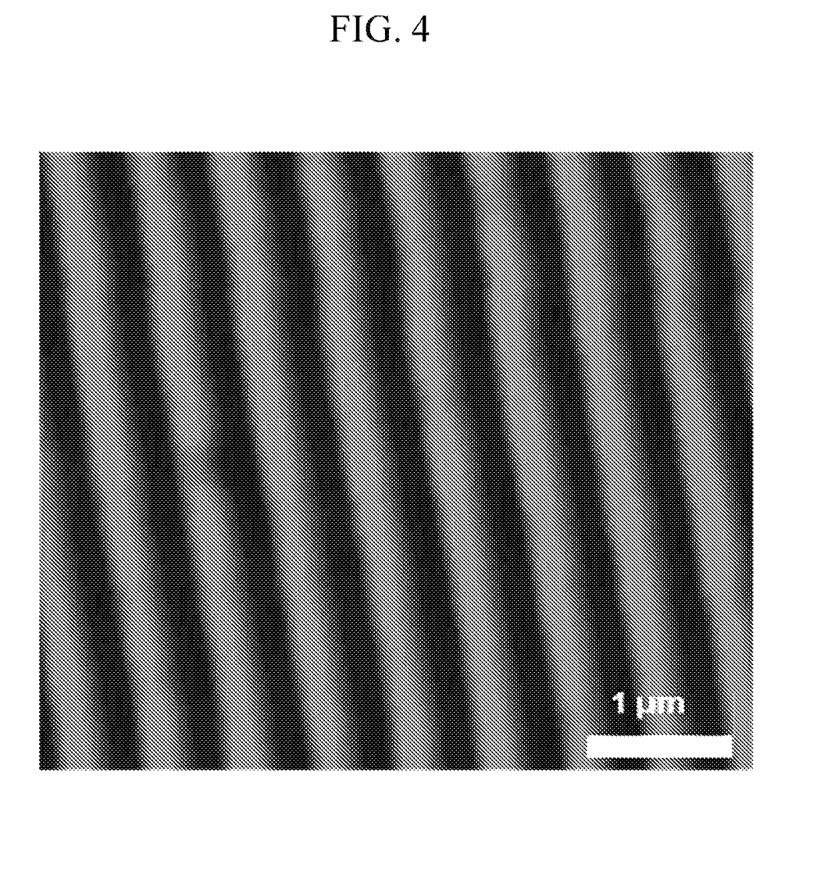
FIG. 4 is an atomic force microscopic photograph after the polymer layer is deposited with copper.

FIG. 4 is an atomic force microscopic photograph after the polymer layer is deposited with copper.

It may be seen from FIGS. 2, 3, and 4 that the shape of protrusions and grooves was not changed even though the protrusions and grooves were formed on the polymer layer and then went through the ultraviolet ray radiation process, the heat treatment process, and the process of depositing copper on the polymer layer.

Surface Photograph

Figure 5:
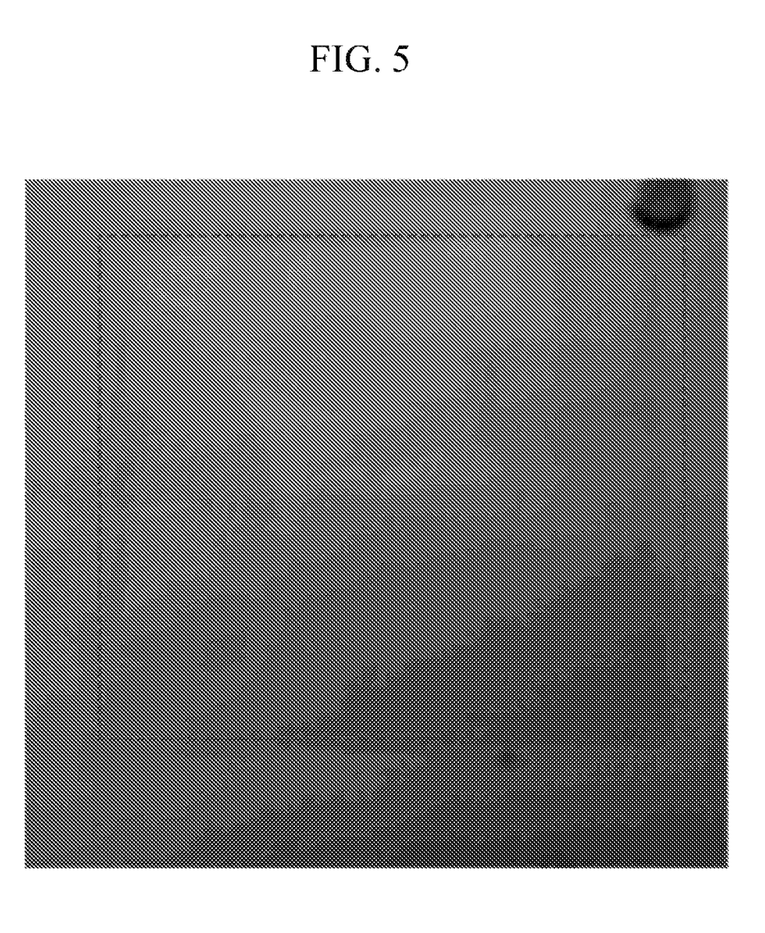
FIG. 5 is a surface photograph of the polymer layer of Example 1 including protrusions and grooves.

FIG. 5 is a surface photograph of the polymer layer of Example 1 including protrusions and grooves.

Although FIG. 5 is a photograph of a plastic pattern where protrusions and grooves were formed which was taken with a digital camera, the pattern was so delicate that it could not be seen with bare eyes.

If any, the surface seems even when it was seen with the bare eyes, and this signifies that the pattern was effectively and uniformly transferred to the polymer layer.

Figure 6:
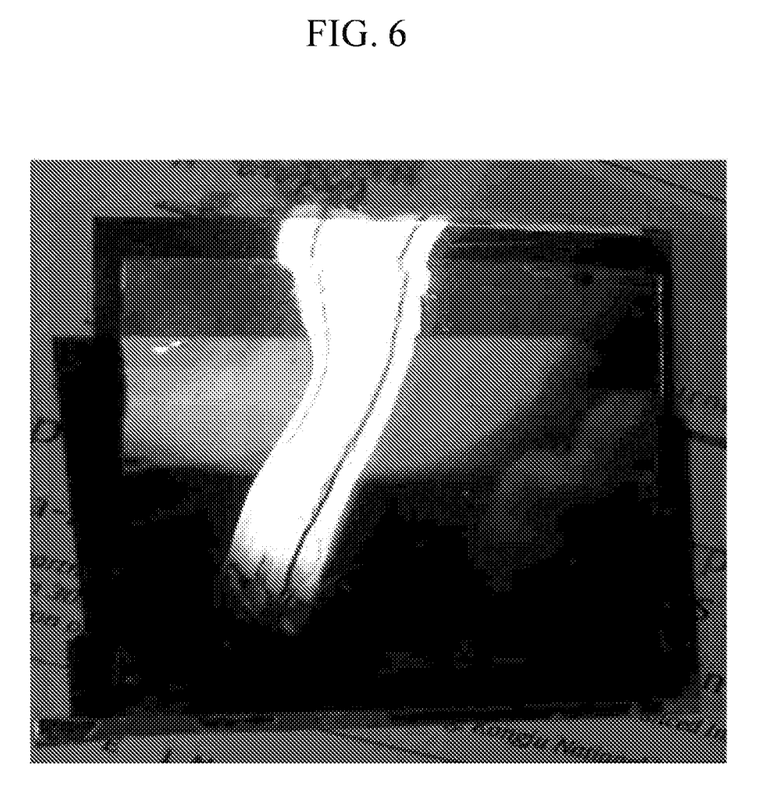
FIG. 6 is a surface photograph of the polymer layer deposited with copper.

FIG. 6 is a surface photograph of the polymer layer deposited with copper.

When a metal such as copper is deposited on the pattern of the polymer layer shown in FIG. 5, the deposited metal reflects light. FIG. 6 shows the surface of the completed flexible current collector, and even though the flexible current collector was bent, the structure of the current collector was not destroyed.

In short, the sawtooth shape was maintained even though copper was deposited on the polymer layer having the sawtooth pattern on the surface. This increases the surface area of the current collector such that the battery capacity is expected to be increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting this disclosure in any way.

What is claimed is:

1. A current collector for a flexible electrode, comprising:
   a flexible polymer substrate;
   a cross-linkable polymer layer disposed on the polymer substrate; and
   a metal layer disposed on the cross-linkable polymer layer, wherein the surface of the cross-linkable polymer layer includes a plurality of protrusions and grooves, wherein the cross-linkable polymer layer forms a boundary surface with the flexible polymer substrate, wherein the cross-linkable polymer layer is formed of a different material from the flexible polymer substrate and contacts the flexible polymer substrate at the boundary surface, and wherein the boundary surface between the cross-linkable polymer layer and the flexible polymer substrate is flatter than the surface of the cross-linkable polymer layer.

2. The current collector for a flexible electrode of claim 1, wherein the flexible polymer substrate comprises at least one selected from the group consisting of polyethylene terephthalate, polyimide, polyester, polyurethane, polyetheretherketone, polycarbonate, and polybutylene terephthalate.

3. The current collector for a flexible electrode of claim 1, wherein the cross-linkable polymer layer comprises a polymer which includes at least one selected from the group consisting of a double bond, a triple bond, an epoxy group, a urethane group, and a functional group of a combination thereof.

4. The current collector for a flexible electrode of claim 1, wherein the metal layer comprises at least one selected from the group consisting of copper (Cu), aluminum (Al), stainless steel, platinum (Pt), and gold (Au).

5. The current collector for a flexible electrode of claim 1, wherein the height of the protrusions ranges from 5 nm to 10 µm.

6. The current collector for a flexible electrode of claim 1, wherein the protrusions and the grooves comprise a repeating unit of a protrusion and a groove, and the repeating unit is formed at every 20 nm to 10 µm.

7. A negative electrode, comprising
a current collector for a flexible electrode of claim 1 is coated with a negative active material, a conductive material, and a binder.

* * * * *